(12) United States Patent
Shan et al.

(10) Patent No.: US 11,256,974 B2
(45) Date of Patent: Feb. 22, 2022

(54) USER TERMINAL HARDWARE DETECTION SYSTEM AND METHOD

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Jiang-Feng Shan, Zhengzhou (CN); Yi-Tao Kao, New Taipei (TW); Ming-Chi Chang, New Taipei (TW); Zhi-Xian Zhuang, New Taipei (TW); Ji-Xiang Yin, Zhengzhou (CN)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 252 days.

(21) Appl. No.: 16/675,015

(22) Filed: Nov. 5, 2019

(65) Prior Publication Data
US 2020/0380337 A1 Dec. 3, 2020

(30) Foreign Application Priority Data
May 30, 2019 (CN) .......................... 201910466019.8

(51) Int. Cl.
*G06N 3/04* (2006.01)
*G06K 9/46* (2006.01)
*G06N 3/08* (2006.01)

(52) U.S. Cl.
CPC .......... *G06N 3/0454* (2013.01); *G06K 9/4609* (2013.01); *G06K 9/4642* (2013.01); *G06N 3/08* (2013.01)

(58) Field of Classification Search
CPC .............................. G06N 3/0454; G06N 3/08
See application file for complete search history.

(56) References Cited

U.S. PATENT DOCUMENTS

2020/0233397 A1* 7/2020 Bello ................... G06N 3/0454

FOREIGN PATENT DOCUMENTS

CN            107993538 A  *  5/2018

* cited by examiner

*Primary Examiner* — Ross Varndell
(74) *Attorney, Agent, or Firm* — ScienBiziP, P.C.

(57) ABSTRACT

A user terminal hardware detection system includes a computing device and an oscilloscope communicatively coupled to the computing device. The oscilloscope obtains a digital signal waveform diagram of a user terminal and sends the digital signal waveform diagram to the computing device. The computing device performs feature recognition on the digital signal waveform diagram using a fault analysis model to identify feature information of the digital signal waveform diagram. The computing device compares the identified feature information to feature information of a faulty hardware module and a fault type of the faulty hardware module in a fault type database. The computing device outputs the faulty hardware module and the fault type of the faulty hardware module represented by the feature information of the digital signal waveform diagram according to a comparison result.

12 Claims, 4 Drawing Sheets

USER TERMINAL HARDWARE DETECTION SYSTEM AND METHOD

FIELD

The subject matter herein generally relates to hardware detection technology, and more particularly to a user terminal hardware detection system and method.

BACKGROUND

Generally, when a user terminal such as a mobile phone requires maintenance or repair, the user terminal is disassembled, and then components inside the user terminal are checked for maintenance or repair. However, disassembly may damage other components inside the user terminal. Therefore, a better user terminal hardware detection method is needed.

BRIEF DESCRIPTION OF THE DRAWINGS

Implementations of the present disclosure will now be described, by way of embodiments, with reference to the attached figures.

DETAILED DESCRIPTION

Figure 1:
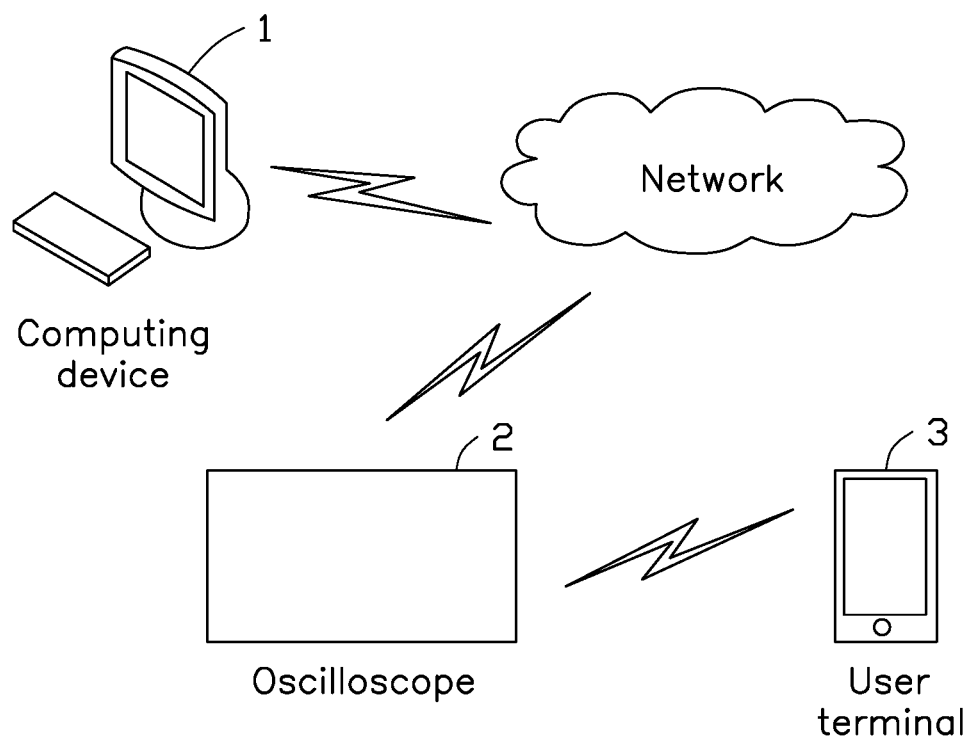
FIG. 1 is a schematic diagram of an embodiment of a user terminal hardware detection system.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 shows an embodiment of a hardware detection system including a computing device 1 and an oscilloscope 2. The computing device 1 is communicatively coupled to the oscilloscope 2 through a network. The network may be a wired network or a wireless network, such as radio, Wireless Fidelity (WIFI), cellular, satellite, broadcast, and the like. The oscilloscope 2 is communicatively coupled to a user terminal 3 through a data line.

Figure 3:
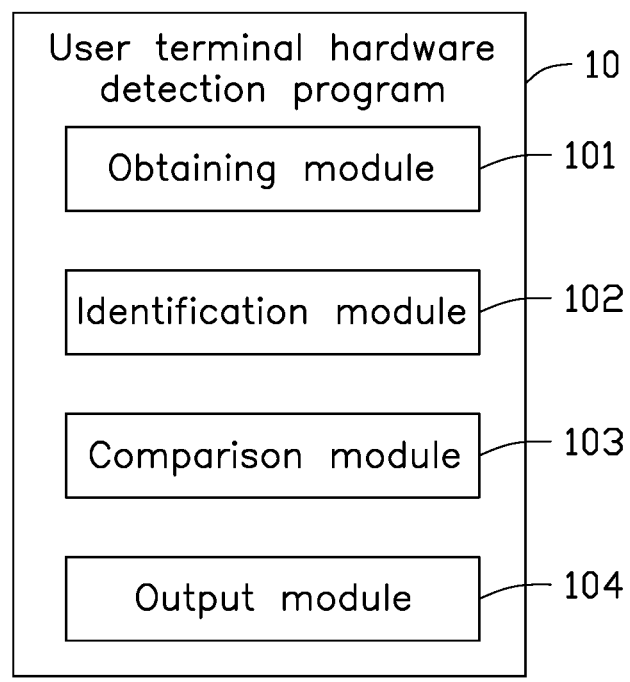
FIG. 3 is a block diagram of a user terminal hardware detection program.

The computing device 1 may be a personal computer, a server, or other electronic device installed with a user terminal hardware detection program 10 (shown in FIG. 3). The server may be a single server, a server cluster, a cloud server, or the like.

The oscilloscope 2 is used to observe different signal amplitudes of various time-varying waveforms for testing various power quantities such as voltage, current, frequency, phase difference, and the like of the user terminal 3.

The user terminal 3 may be a smart phone, a tablet computer, a laptop computer, a desktop computer, or other similar electronic device.

Figure 2:
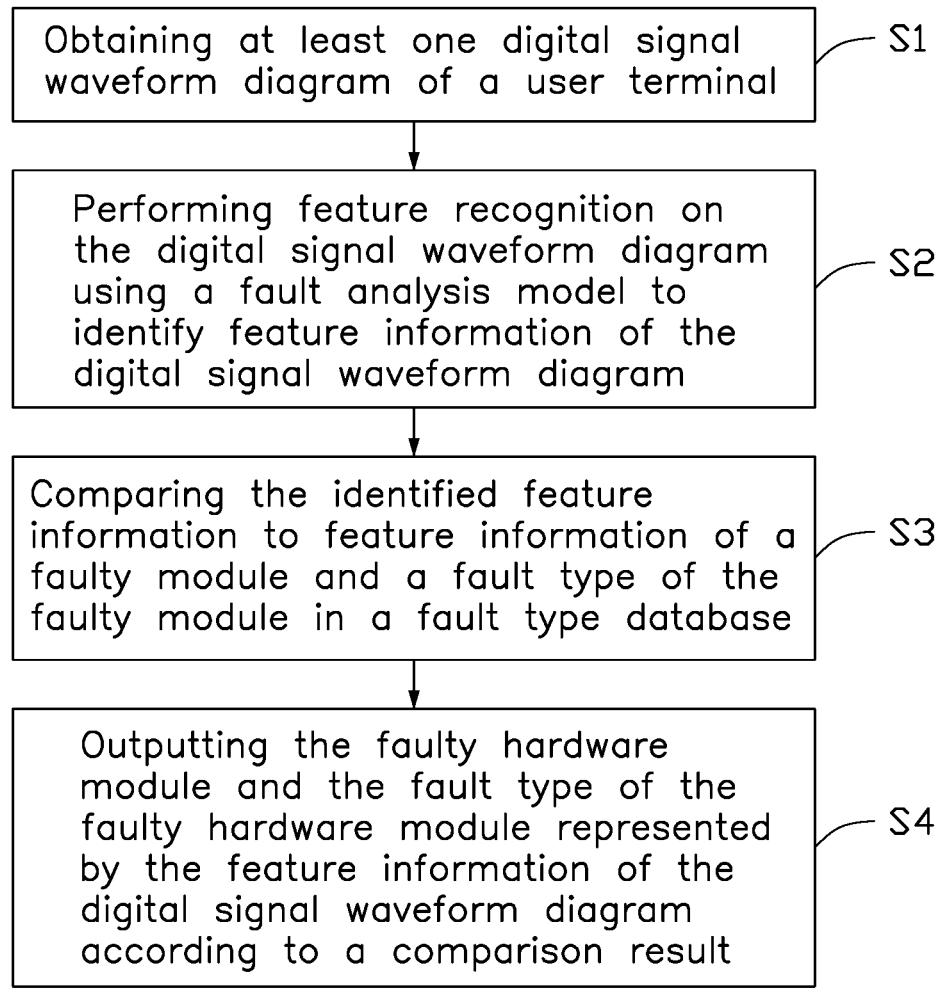
FIG. 2 is a flowchart of a user terminal hardware detection method.

FIG. 2 shows a flowchart of a user terminal hardware detection method. The order of blocks in the flowchart may be changed according to different requirements, and some blocks may be omitted.

At block S1, at least one digital signal waveform diagram of the user terminal 3 is obtained.

In one embodiment, the digital signal waveform diagram of the user terminal 3 is obtained by the oscilloscope 2, and the oscilloscope 2 transmits the digital signal waveform diagram to the computing device 1. The digital signal waveform diagram shows changes in voltage and/or current.

For example, if a voice input function of the user terminal 3 fails and sound cannot be input, the user terminal 3 is coupled to the oscilloscope 2 through the data line, and the oscilloscope 2 obtains the current and voltage digital signal waveform diagrams of the user terminal 3. The oscilloscope 2 transmits the obtained digital signal waveform diagrams to the computing device 1.

At block S2, a fault analysis model is used to perform feature recognition on the digital signal waveform diagram.

In one embodiment, the fault analysis model is a deep learning model based on a convolutional neural network.

A process for constructing the fault analysis model is described as follows.

A sample waveform diagram of a plurality of digital signal samples is obtained. The sample waveform diagram is divided into a training set and a verification set. The deep learning model is established based on a convolutional neural network, and the training set is used for training the deep learning model. The verification set is used for verifying the deep learning model, and a model prediction accuracy is obtained according to a verification result. Whether the model prediction accuracy is less than a preset threshold is determined. If the model prediction accuracy is not less than the preset threshold, the trained deep learning model is used as the fault analysis model. If the model prediction accuracy is less than the preset threshold, parameters of the deep learning model are adjusted, and the training set is used for re-training the adjusted deep learning model.

The verification set is used for verifying the retrained deep learning model, and a model prediction accuracy of the retrained deep learning model is obtained according to the verification result. Whether the recalculated model prediction accuracy is less than the preset threshold is determined. If the recalculated model prediction accuracy is not less than the preset threshold, the retrained deep learning model is used as the fault analysis model. If the recalculated model prediction accuracy is less than the preset threshold, the parameters of the deep learning model are readjusted, the training set is used for re-training the adjusted deep learning model, and the verification set is used for verifying the retrained deep learning model. The parameters of the deep learning model are readjusted, the training set is used for retraining the adjusted deep learning model, and the verification set is used for verifying the retrained deep learning model until the model prediction accuracy obtained by the verification set is not less than the preset threshold.

The parameters of the deep learning model based on the convolutional neural network include at least one of a number of convolution kernels, a number of elements in the pooled layer, and a number of elements in the fully connected layer.

The fault analysis model may be constructed as follows. A preset number of known faulty hardware modules and a digital signal waveform diagram of corresponding to a fault type of each of the faulty hardware modules are obtained. The preset number may be based on actual situation requirements. As the preset number increases, the fault analysis model becomes more accurate. The digital signal waveform diagrams are each divided into training sets and the verification sets. The digital signal waveform diagram of the training set is converted into a digital feature matrix, and then the digital feature matrix is imported into a deep learning model based on a convolutional neural network for feature recognition. Convolution processing is performed on elements in the digital feature matrix using a convolution kernel, and data is simplified through the convolution layer using the pooling layer to remove redundant information. The information of the pooling layer is converted to the fully connected layer by a function of the fully connected layer, and after the digital signal waveform is processed by the deep learning model based on the convolutional neural network, the feature information of the image is enhanced and extracted. The feature information includes values of current and/or voltage. Then, the digital signal waveform diagram in the verification set is used. The convolution kernel, the pooling layer, and the fully connected layer in the above-described deep learning model based on the convolutional neural network are used to identify the digital signal waveform diagram in the verification set, and the identified current and voltage values are compared to the current and voltage values in the faulty hardware module of the training set and the fault type of the faulty hardware module. If the accuracy of the current and voltage values obtained by the training set is not less than the preset threshold, the training is completed. The deep learning model based on the convolutional neural network can be used as the fault analysis model. If the accuracy of the current and voltage values obtained by the training is less than the preset threshold, one or more of the number of convolution kernels, the elements in the convolution kernel matrix, the number of elements in the pooling layer, and the number of elements in the fully connected layer are re-adjusted. After adjustment is completed, the model is retrained using the training set, and the accuracy of the model is verified by using the verification set after the training is completed. Retraining and verification of the retrained model is performed until the accuracy of the algorithm model is not less than the preset threshold.

In one embodiment, the computing device 1 performs feature recognition on the obtained digital signal waveform diagram of the user terminal 3 using the trained deep learning model based on the convolutional neural network to obtain the feature information of the digital signal waveform diagram. The feature information is the current and voltage values.

At block S3, the identified feature information is compared to feature information of the fault type in a fault type database.

In one embodiment, the fault type database is constructed as follows. A known faulty hardware module and a digital signal waveform diagram of the fault type of the known faulty hardware module are substituted into the trained fault analysis model. The fault analysis model is used to analyze and obtain the feature information of the known faulty hardware module and the corresponding fault type of the known faulty hardware module. The known faulty hardware module and the fault type are mapped to the analyzed feature information and stored.

In one embodiment, the feature information is voltage and current information corresponding to a known faulty hardware module and a fault type of the known faulty hardware module.

For example, the fault type database is constructed as follows. The known faulty hardware module may be a USB hardware module, the fault type of the faulty hardware module may be an open circuit fault, and the user terminal 3 may be a smart phone. A smart phone having a circuit interruption fault of the USB hardware module is selected, the user terminal 3 is coupled to the oscilloscope 2 through a data line interface, and the oscilloscope 2 obtains a current waveform diagram and a voltage waveform diagram from the user terminal 3. The oscilloscope 2 transmits the obtained digital signal waveform diagrams to the computing device 1. The computing device 1 converts the digital signal waveform diagrams into a digital feature matrix, and then imports the digital feature matrix into a deep learning model based on a convolutional neural network to perform feature fitting to obtain the feature information of the digital feature matrix. A mapping relationship is mapped from the feature information to the known faulty hardware module and the corresponding fault type of the known faulty hardware module.

In another embodiment, the computing device 1 compares the feature information identified by the fault analysis model to the feature information in the fault type database, and determines the faulty module and the fault type matching the identified feature information.

At block S4, the faulty hardware module and the fault type of the faulty hardware module represented by the feature information of the digital signal waveform diagram are output according to the comparison result.

In one embodiment, the faulty hardware module and the fault type may be displayed on the computing device 1.

In other embodiments, the faulty hardware module and the fault type of the faulty hardware module may be sent to a preset other computing device.

FIG. 3 shows a block diagram of an embodiment of the user terminal hardware detection program 10. The user terminal hardware detection program 10 may include a plurality of functional modules, which may be stored in a memory of the computing device 1 and executed by at least one processor of the computing device 1 to implement functions of the user terminal hardware detection program 10.

In one embodiment, the user terminal hardware detection program 10 includes an obtaining module 101, an identification module 102, a comparison module 103, and an output module 104.

The obtaining module 101 obtains at least one digital signal waveform diagram of the user terminal 3.

In one embodiment, the digital signal waveform diagram of the user terminal 3 is obtained by the oscilloscope 2, and the oscilloscope 2 transmits the digital signal waveform diagram to the obtaining module 101. The digital signal waveform diagram shows changes in voltage and/or current.

For example, if a voice input function of the user terminal 3 fails and sound cannot be input, the user terminal 3 is coupled to the oscilloscope 2 through the data line, and the oscilloscope 2 obtains the current and voltage digital signal waveform diagrams of the user terminal 3. The oscilloscope 2 transmits the obtained digital signal waveform diagrams to the obtaining module 101.

The identification module 102 uses a fault analysis module to perform feature recognition on the digital signal waveform diagram.

In one embodiment, the fault analysis model is a deep learning model based on a convolutional neural network.

A process for constructing the fault analysis model is described as follows.

A sample waveform diagram of a plurality of digital signal samples is obtained. The sample waveform diagram is divided into a training set and a verification set. The deep learning model is established based on a convolutional neural network, and the training set is used for training the deep learning model. The verification set is used for verifying the deep learning model, and a model prediction accuracy is obtained according to a verification result. Whether the model prediction accuracy is less than a preset threshold is determined. If the model prediction accuracy is not less than the preset threshold, the trained deep learning model is used as the fault analysis model. If the model prediction accuracy is less than the preset threshold, parameters of the deep learning model are adjusted, and the training set is used for re-training the adjusted deep learning model.

The verification set is used for verifying the retrained deep learning model, and a model prediction accuracy of the retrained deep learning model is obtained according to the verification result. Whether the recalculated model prediction accuracy is less than the preset threshold is determined. If the recalculated model prediction accuracy is not less than the preset threshold, the retrained deep learning model is used as the fault analysis model. If the recalculated model prediction accuracy is less than the preset threshold, the parameters of the deep learning model are readjusted, the training set is used for re-training the adjusted deep learning model, and the verification set is used for verifying the retrained deep learning model. The parameters of the deep learning model are readjusted, the training set is used for retraining the adjusted deep learning model, and the verification set is used for verifying the retrained deep learning model until the model prediction accuracy obtained by the verification set is not less than the preset threshold.

The parameters of the deep learning model based on the convolutional neural network include at least one of a number of convolution kernels, a number of elements in the pooled layer, and a number of elements in the fully connected layer.

The fault analysis model may be constructed as follows. A preset number of known faulty hardware modules and a digital signal waveform diagram of corresponding to a fault type of each of the faulty hardware modules are obtained. The preset number may be based on actual situation requirements. As the preset number increases, the fault analysis model becomes more accurate. The digital signal waveform diagrams are each divided into training sets and the verification sets. The digital signal waveform diagram of the training set is converted into a digital feature matrix, and then the digital feature matrix is imported into a deep learning model based on a convolutional neural network for feature recognition. Convolution processing is performed on elements in the digital feature matrix using a convolution kernel, and data is simplified through the convolution layer using the pooling layer to remove redundant information. The information of the pooling layer is converted to the fully connected layer by a function of the fully connected layer, and after the digital signal waveform is processed by the deep learning model based on the convolutional neural network, the feature information of the image is enhanced and extracted. The feature information includes values of current and/or voltage. Then, the digital signal waveform diagram in the verification set is used. The convolution kernel, the pooling layer, and the fully connected layer in the above-described deep learning model based on the convolutional neural network are used to identify the digital signal waveform diagram in the verification set, and the identified current and voltage values are compared to the current and voltage values in the faulty hardware module of the training set and the fault type of the faulty hardware module. If the accuracy of the current and voltage values obtained by the training set is not less than the preset threshold, the training is completed. The deep learning model based on the convolutional neural network can be used as the fault analysis model. If the accuracy of the current and voltage values obtained by the training is less than the preset threshold, one or more of the number of convolution kernels, the elements in the convolution kernel matrix, the number of elements in the pooling layer, and the number of elements in the fully connected layer are re-adjusted. After adjustment is completed, the model is retrained using the training set, and the accuracy of the model is verified by using the verification set after the training is completed. Retraining and verification of the retrained model is performed until the accuracy of the algorithm model is not less than the preset threshold.

In one embodiment, the identification module 102 performs feature recognition on the obtained digital signal waveform diagram of the user terminal 3 using the trained deep learning model based on the convolutional neural network to obtain the feature information of the digital signal waveform diagram. The feature information is the current and voltage values.

The comparison module 103 compares the identified feature information to feature information of the fault type in a fault type database.

In one embodiment, the fault type database is constructed as follows. A known faulty hardware module and a digital signal waveform diagram of the fault type of the known faulty hardware module are substituted into the trained fault analysis model. The fault analysis model is used to analyze and obtain the feature information of the known faulty hardware module and the corresponding fault type of the known faulty hardware module. The known faulty hardware module and the fault type are mapped to the analyzed feature information and stored.

In one embodiment, the feature information is voltage and current information corresponding to a known faulty hardware module and a fault type of the known faulty hardware module.

For example, the fault type database is constructed as follows. The known faulty hardware module may be a USB hardware module, the fault type of the faulty hardware module may be an open circuit fault, and the user terminal 3 may be a smart phone. A smart phone having a circuit interruption fault of the USB hardware module is selected, the user terminal 3 is coupled to the oscilloscope 2 through a data line interface, and the oscilloscope 2 obtains a current waveform diagram and a voltage waveform diagram from the user terminal 3. The oscilloscope 2 transmits the obtained digital signal waveform diagrams to the comparison module 103. The comparison module 103 converts the digital signal waveform diagrams into a digital feature matrix, and then imports the digital feature matrix into a deep learning model based on a convolutional neural network to perform feature fitting to obtain the feature information of the digital feature matrix. A mapping relationship is mapped from the feature information to the known faulty hardware module and the corresponding fault type of the known faulty hardware module.

In another embodiment, the comparison module 103 compares the feature information identified by the fault analysis model to the feature information in the fault type database, and determines the faulty module and the fault type matching the identified feature information.

The output module 104 outputs the faulty hardware module and the fault type of the faulty hardware module represented by the feature information of the digital signal waveform diagram according to the comparison result.

In one embodiment, the faulty hardware module and the fault type may be displayed on the computing device 1.

In other embodiments, the faulty hardware module and the fault type of the faulty hardware module may be sent to a preset other computing device.

Figure 4:
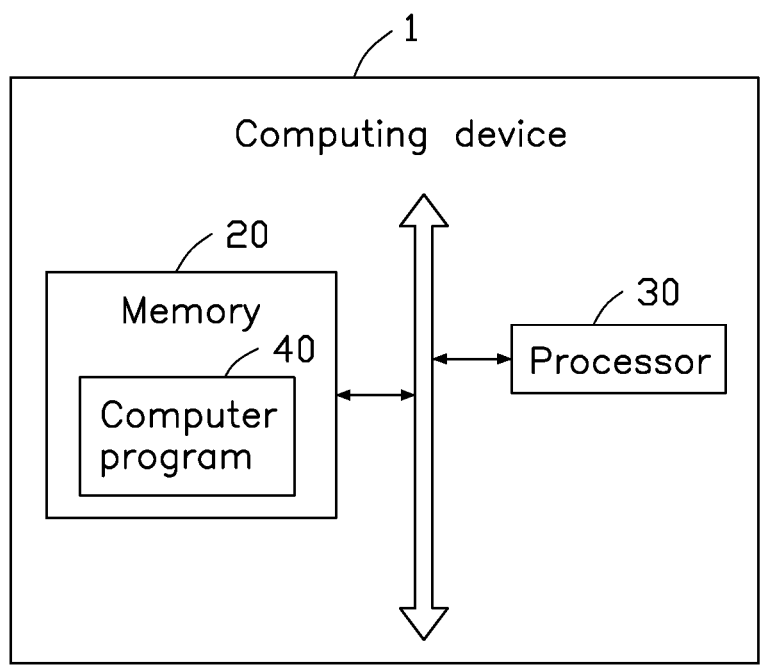
FIG. 4 is a block diagram of a computing device.

FIG. 4 is a block diagram of the computing device 1. The computing device 1 includes a memory 20, a processor 30, and a computer program 40. The computer program 40 may be the user terminal hardware detection program 10, which is stored in the memory 20 and executable by the processor 30. When the processor 30 executes the computer program 40, the blocks of the method in FIG. 2 may be implemented. Alternatively, when the processor 30 executes the computer program 40, the functions of the functional modules in FIG. 3 may be implemented.

The computer program 40 can be partitioned into one or more modules/units that are stored in the memory 20 and executed by the processor 30. The one or more modules/units may be a series of computer program instructions capable of performing particular functions of the computer program 40. For example, the computer program 40 can be divided into the obtaining module 101, the identification module 102, the comparison module 103, and the output module 104.

The computing device 1 may be a desktop computer, a notebook computer, a cloud server, or the like. The computing device 1 may include more or less components than those illustrated, and some components may be combined. The computing device 1 may also include input and output devices, network access devices, buses, and the like.

The processor 30 may be a central processing unit (CPU), or may be other general-purpose processors, a digital signal processor (DSP), an application specific integrated circuit (ASIC), a Field-Programmable Gate Array (FPGA), or other programmable logic device, discrete gate or transistor logic device, discrete hardware components, or the like. The processor 30 may be a microprocessor or other processor known in the art.

The memory 20 can be used to store the computer program 40 and/or modules/units by running or executing computer programs and/or modules/units stored in the memory 20. The memory 20 may include a storage program area and a storage data area. In addition, the memory 20 may include a high-speed random access memory, a non-volatile memory such as a hard disk, a plug-in hard disk, a smart memory card (SMC), and a secure digital (SD) card, flash card, at least one disk storage device, flash device, or other volatile solid state storage device.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A user terminal hardware detection method comprising:
   obtaining at least one digital signal waveform diagram of a user terminal;
   performing feature recognition on the digital signal waveform diagram using a fault analysis model to identify feature information of the digital signal waveform diagram;
   comparing the identified feature information to feature information of a faulty module and a fault type of the faulty module in a fault type database; and
   outputting the faulty hardware module and the fault type of the faulty hardware module represented by the feature information of the digital signal waveform diagram according to a comparison result;
   wherein the fault analysis model is constructed by:
   obtaining a sample waveform diagram of a plurality of digital signal samples;
   dividing the sample waveform diagram into a training set and a verification set;
   establishing a deep learning model based on a convolutional neural network and using the training set for training the deep learning model;
   using the verification set for verifying the deep learning model and obtaining a model prediction accuracy according to a verification result;
   determining whether the model prediction accuracy is less than a preset threshold; and
   using the trained deep learning model as the fault analysis model if the model prediction accuracy is not less than the preset threshold.

2. The user terminal hardware detection method of claim 1, wherein:
   the feature information comprises at least one of voltage information and current information.

3. The user terminal hardware detection method of claim 1, wherein:
   the fault analysis model is a deep learning model based on a convolutional neural network.

4. The user terminal hardware detection method of claim 1, wherein:
   if the model prediction accuracy is less than the preset threshold, parameters of the deep learning model are adjusted, and the training set is used for re-training the adjusted deep learning model;

the verification set is used for verifying the retrained deep learning model, and whether the model prediction accuracy of the retrained deep learning model is less than the preset threshold is determined;

if the model prediction accuracy of the retrained deep learning model is not less than the preset threshold, the retrained deep learning model is used as the fault analysis model;

if the model prediction accuracy of the retrained deep learning model is less than the preset threshold, the parameters of the deep learning model are adjusted, the adjusted deep learning model is retrained, and the retrained deep learning model is verified until the model prediction accuracy of the retrained deep learning model is not less than the preset threshold;

the parameters of the deep learning model based on the convolutional neural network comprise at least one of a number of convolution kernels, a number of elements in the pooled layer, and a number of elements in the fully connected layer.

5. The user terminal hardware detection method of claim 1, wherein the fault type database is constructed by:

substituting a known faulty hardware module and a digital signal waveform diagram of the fault type of the known faulty hardware module into the trained fault analysis model;

using the fault analysis model to analyze and obtain the feature information of the known faulty hardware module and the corresponding fault type of the known faulty hardware module; and mapping and storing the known faulty hardware module and the fault type to the analyzed feature information.

6. The user terminal hardware detection method of claim 5, wherein:

the feature information is voltage and current information corresponding to the known faulty hardware module and the fault type of the known faulty hardware module.

7. A user terminal hardware detection system comprising:
a computing device; and
an oscilloscope communicatively coupled to the computing device through a network;
wherein:
the oscilloscope is communicatively coupled to a user terminal through a data line to obtain at least one digital signal waveform diagram of the user terminal, the oscilloscope sends the at least one digital signal waveform diagram to the computing device;
the computing device performs feature recognition on the digital signal waveform diagram using a fault analysis model to identify feature information of the digital signal waveform diagram;
the computing device compares the identified feature information to feature information of a faulty hardware module and a fault type of the faulty hardware module in a fault type database; and
the computing device outputs the faulty hardware module and the fault type of the faulty hardware module represented by the feature information of the digital signal waveform diagram according to a comparison result;
wherein the fault analysis model is constructed by:
obtaining a sample waveform diagram of a plurality of digital signal samples;

dividing the sample waveform diagram into a training set and a verification set;

establishing a deep learning model based on a convolutional neural network and using the training set for training the deep learning model;

using the verification set for verifying the deep learning model and obtaining a model prediction accuracy according to a verification result;

determining whether the model prediction accuracy is less than a preset threshold; and using the trained deep learning model as the fault analysis model if the model prediction accuracy is not less than the preset threshold.

8. The user terminal hardware detection system of claim 7, wherein:
the feature information comprises at least one of voltage and current information.

9. The user terminal hardware detection system of claim 7, wherein:
the fault analysis model is a deep learning model based on a convolutional neural network.

10. The user terminal hardware detection system of claim 7, wherein:
if the model prediction accuracy is less than the preset threshold, parameters of the deep learning model are adjusted, and the training set is used for re-training the adjusted deep learning model;

the verification set is used for verifying the retrained deep learning model, and whether the model prediction accuracy of the retrained deep learning model is less than the preset threshold is determined;

if the model prediction accuracy of the retrained deep learning model is not less than the preset threshold, the retrained deep learning model is used as the fault analysis model;

if the model prediction accuracy of the retrained deep learning model is less than the preset threshold, the parameters of the deep learning model are adjusted, the adjusted deep learning model is retrained, and the retrained deep learning model is verified until the model prediction accuracy of the retrained deep learning model is not less than the preset threshold;

the parameters of the deep learning model based on the convolutional neural network comprise at least one of a number of convolution kernels, a number of elements in the pooled layer, and a number of elements in the fully connected layer.

11. The user terminal hardware detection system of claim 7, wherein the fault type database is constructed by:

substituting a known faulty hardware module and a digital signal waveform diagram of the fault type of the known faulty hardware module into the trained fault analysis model;

using the fault analysis model to analyze and obtain the feature information of the known faulty hardware module and the corresponding fault type of the known faulty hardware module; and mapping and storing the known faulty hardware module and the fault type to the analyzed feature information.

12. The user terminal hardware detection system of claim 11, wherein:
the feature information is voltage and current information corresponding to the known faulty hardware module and the fault type of the known faulty hardware module.

* * * * *